Dec. 8, 1953

G. A. LASH ET AL 2,661,846

FILTER

Filed March 14, 1950

INVENTORS
Gerland A. Lash
Ernest B. Chamberlin

ATTYS

Patented Dec. 8, 1953

2,661,846

UNITED STATES PATENT OFFICE 2,661,846

FILTER

Gerland A. Lash and Ernest B. Chamberlin, Stockton, Calif.; said Lash assignor to said Chamberlin Application March 14, 1950, Serial No. 149,639

4 Claims. (Cl. 210—164)

The present invention is directed to, and it is an object to provide, a novel oil filter for use in connection with the oil system of internal combustion engines, especially in motor vehicles.

It is a major object of the invention to provide an oil filter wherein the filter element, of replaceable type, comprises a tightly wound or wrapped roll of relatively porous paper tissue; the most adaptable filter element for the purpose being an ordinary toilet tissue roll of standard size, and the oil under pressure being fed through the roll endwise to accomplish the filtering action.

The advantages accruing from use of a toilet tissue roll as the filter element are simplicity, availability, cheapness, and ease of replacement.

Another object of the invention is to provide an oil filter having a body unit which is especially adapted to receive a standard size roll of toilet tissue; such body unit including a novel arrangement which locates and seals off the tubular center core of the roll whereby to form a passage for the flow of unfiltered oil, and the latter being fed from said passage to one end of the roll for filtering flow therethrough to the opposite end.

A further object of the invention is to provide an oil filter, having a replaceable filter element as described, wherein the body element is of a novel configuration, top and bottom, to assure of proper feed of unfiltered oil into one end of the filter roll, and free flow of filtered oil away from the opposite end.

Still another object of the invention is to provide an oil filter which is designed for ready and economical manufacture.

Another object of the invention is to provide a practical and reliable oil filter, and one which will be exceedingly effective for the purpose for which it is designed.

These objects are accomplished by means of such structure and relative arrangement of parts as will fully appear by a perusal of the following specification and claims.

Figure 1:
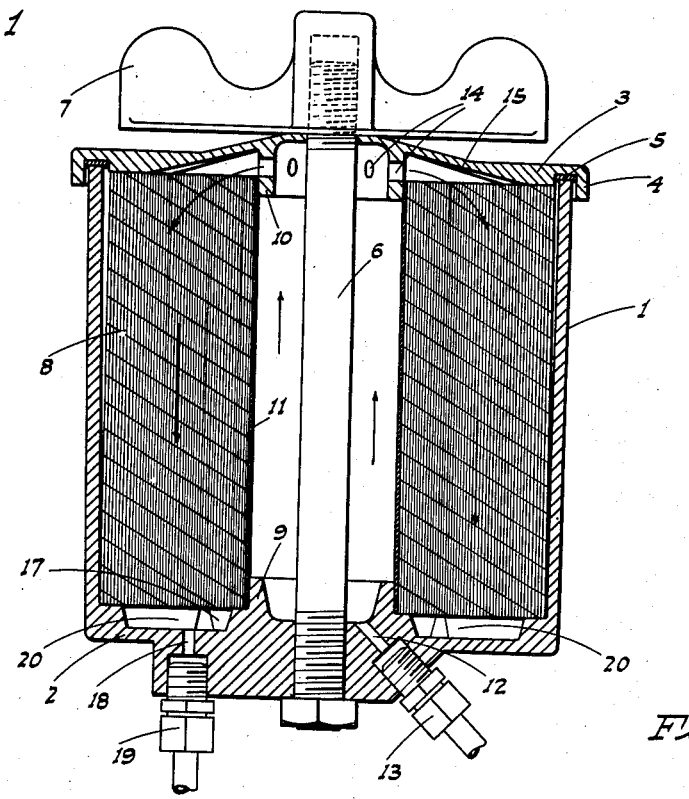
Fig. 1 is a sectional elevation of the oil filter including the filter element therein.
Figure 2:
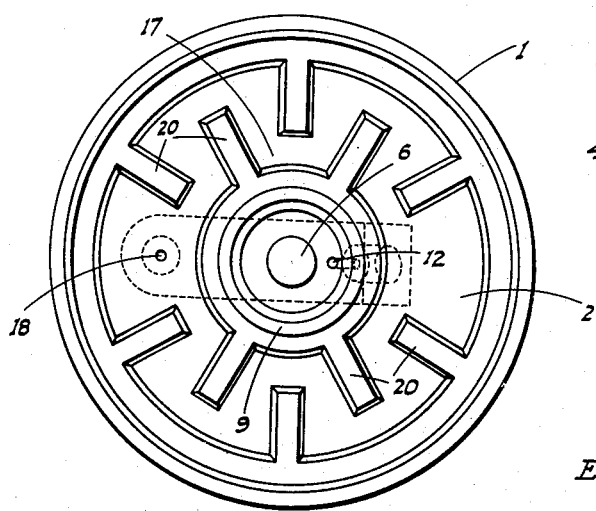
Fig. 2 is a top plan of the device with the cover, and the filter element, removed.
Figure 3:
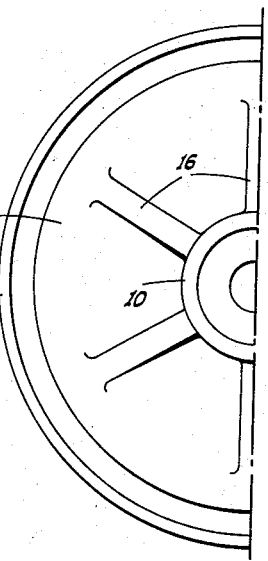
Fig. 3 is a fragmentary bottom plan view of the cover.

Referring now more particularly to the characters of reference on the drawings, the novel oil filter comprises a cylindrical metallic body 1 having a closed bottom 2; such body being initially open at the top, but normally closed by a circular cover 3 which includes a depending peripheral flange 4 and a sealing gasket 5 which engages with the upper end of said body.

The cover 3 is normally held in place on the body 1 by means of a vertical stud 6 which is secured centrally to the bottom 2, and upstands through the body 1, passing through a central bore in the cover 3; there being a wing nut 7 threaded on the stud above said cover and frictionally engaging downward against the latter.

The cylindrical body 1 is slightly internally tapered from top to bottom to facilitate insertion and removal of a filter element; the filter element comprising a tightly wound or wrapped roll 8 of relatively porous paper tissue, preferably a standard size roll of toilet tissue. As disposed in the body 1 the roll 8 is supported endwise to the adjacent bottom 2 and cover 3 of the device.

The bottom of the body 2, and the cover 3, are each formed centrally thereof with an inwardly projecting tubular boss; said bosses being indicated at 9 and 10, respectively.

The bosses 9 and 10 engage in locating and sealing relation in the adjacent ends of the tubular center core 11 which the roll of tissue 8 includes, and which core as usual is substantially non-foraminous as far as any ready penetration of oil therethrough is concerned.

The oil flow passage assembly through the device comprises the following:

A passage 12 provided with a fitting 13 leads through the bottom 2 of the body into the interior of the tubular boss 9, whence oil may flow from the fitting 13 through the passage 12 into the tubular center core 11.

At the upper end of said tubular center core 11 the oil passes outwardly through ports 14 in the sides of the tubular boss 10 above the upper end of the roll 8; a central portion of the cover 3 being internally domed, as at 15, so that the oil as it leaves the port 14 has access to the upper end of the roll 8.

Additionally, within the domed central portion 15 of the cover 3, there are a plurality of circumferentially spaced, radial ribs 16 which engage the upper end of the roll 8 in hold-down relation to the latter.

The oil which gains access, as above, to the upper end of the roll 8 is under pressure and is forced downwardly through the filter element comprised of the roll of paper tissue 8; thus effectively filtering such oil.

At the lower end of the roll 8 the filtered oil discharges into an upwardly facing annular channel 17 formed in the bottom 2 of the body 1, and from said channel the filtered oil delivers from the body through a bottom passage 18 provided with a fitting 19.

In order that the lower end of the roll 8 does not sag into the annular channel 17, such channel is formed concentric to the vertical axis of the device and of somewhat lesser width than the radius of the roll 8 outwardly of the tubular center core 11. Consequently the bottom 2 supports the lower end of the roll 8 laterally of opposite sides of said channel.

Additionally, roll-supporting ribs 20 upstand from the bottom of the annular channel 17 in circumferentially spaced relation; such ribs extending partially across the channel alternately from opposite sides thereof.

With the described filter unit a standard sized roll of toilet tissue may be employed in an effective and practical manner as the filter element; the prime advantage being the ready availability on the market of rolls of toilet tissue for use as the filter element, such rolls being inexpensive, and when used easy to replace in the filter.

The filter is designed, in its structure, for ready and economical manufacture, being especially suited to casting of the primary parts.

While the filter is here shown and described for use with a single roll 8, for heavy-duty adaptations the cylindrical body 1 may be double length so that two rolls of the paper tissue may be engaged in the body in end to end relation.

From the foregoing description it will be readily seen that there has been produced such a device as substantially fulfills the objects of the invention, as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful, and upon which Letters Patent are desired:

1. An oil filter comprising a cylindrical body closed at the bottom and initially open at the top, a cover removably secured on the body at the top, a roll of paper tissue replaceably disposed in the body as the filter element, said roll including a substantially imporous tubular center core, a boss depending from the cover into the top of the core in sealing relation therewith, the cover having an annular space thereabout above the roll and radially out from the boss and the latter having oil passage means therethrough communicating with said space, means in the bottom of the body engaging the lower end of the roll in core-sealing relation and providing an annular channel under the roll radially out from the core; there being oil passages leading to said channel and the interior of the core from the outside of the body.

2. A filter as in claim 1, in which the cover, radially out from said space, is formed with a circumferential flat surface engaging the top of the roll adjacent its outer periphery, and radial ribs extending across said space from said surface to the boss and on a level with such surface; the oil passage means in the boss comprising holes between adjacent ribs.

3. An oil filter comprising a cylindrical body closed at the bottom and initially open at the top, a cover removably secured on the body at the top, a roll of paper tissue replaceably disposed in the body as the filter element, said roll including a substantially imporous tubular center core, a boss depending from the cover into the top of the core in sealing relation therewith, the cover having an annular space thereabout above the roll and radially out from the boss and the latter having oil passage means therethrough communicating with said space, a core engaging and sealing boss upstanding from the bottom of the body, radially spaced inner and outer flat ledges in said bottom supporting the inner and outer peripheral portions of the roll, the ledges leaving an annular channel in the bottom therebetween, and radial roll supporting ribs extending part way across the channel from the inner and outer ledges alternately; there being oil passages leading to said channel and the interior of the core from the outside of the body.

4. In an oil filter wherein the filter element is a roll of paper tissue; the filter including a body having a bottom on which the roll is seated, means in said bottom to support the roll to maintain the turns thereof against axial displacement while providing for a circulation of oil under the roll, said means comprising radially spaced inner and outer flat ledges in said bottom supporting the inner and outer peripheral portions of the roll, the ledges leaving an annular channel in the bottom therebetween, and radial roll supporting ribs extending part way across the channel from the inner and outer ledges alternately; there being an oil passage leading through the bottom of the body to said channel.

GERLAND A. LASH.
ERNEST B. CHAMBERLIN.

References Cited in the file of this patent

UNITED STATES PATENTS

| Number | Name | Date |
|---|---|---|
| 1,753,809 | Short | Apr. 8, 1930 |
| 2,086,739 | Reed | July 13, 1937 |
| 2,110,009 | Weidenbacker | Mar. 1, 1938 |
| 2,357,572 | Baldwin | Sept. 5, 1944 |
| 2,537,897 | Hunter | July 9, 1951 |